US006412061B1

United States Patent
Dye

(10) Patent No.: US 6,412,061 B1
(45) Date of Patent: *Jun. 25, 2002

(54) DYNAMIC PIPELINES WITH REUSABLE LOGIC ELEMENTS CONTROLLED BY A SET OF MULTIPLEXERS FOR PIPELINE STAGE SELECTION

(75) Inventor: Thomas Anthony Dye, Austin, TX (US)

(73) Assignee: Cirrus Logic, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 09/007,029

(22) Filed: Jan. 14, 1998

Related U.S. Application Data

(63) Continuation of application No. 08/854,654, filed on May 12, 1997, now Pat. No. 5,778,250, which is a continuation of application No. 08/247,657, filed on May 23, 1994, now abandoned.

(51) Int. Cl.[7] ............................................. G06F 15/00
(52) U.S. Cl. ..................... 712/32; 712/23; 712/200; 712/215; 712/216; 712/217; 712/218; 712/219; 712/220; 326/93; 326/97
(58) Field of Search ................................ 712/4, 200, 23, 712/32, 215–220; 711/135, 169; 395/800.32, 394; 708/406; 713/503; 326/93, 97

(56) References Cited

U.S. PATENT DOCUMENTS

| | | | | | |
|---|---|---|---|---|---|
| 4,493,019 | A | * | 1/1985 | Kim et al. | 395/571 |
| 5,148,529 | A | * | 9/1992 | Ueda et al. | 395/394 |
| 5,293,330 | A | * | 3/1994 | Sayegh | 708/406 |
| 5,434,520 | A | * | 7/1995 | Yetter et al. | 326/93 |
| 5,604,909 | A | * | 2/1997 | Joshi et al. | 395/384 |
| 5,706,478 | A | * | 1/1998 | Dye | 345/503 |
| 5,778,250 | A | * | 7/1998 | Dye | 395/800.32 |
| 5,809,552 | A | * | 9/1998 | Kuroiwa et al. | 711/169 |
| 5,822,561 | A | * | 10/1998 | Nakajima | 395/395 |
| 5,835,949 | A | * | 11/1998 | Quattromani et al. | 711/135 |
| 5,886,540 | A | * | 3/1999 | Perez | 326/93 |
| 5,889,979 | A | * | 3/1999 | Miller Jr, et al. | 713/503 |
| 5,930,492 | A | * | 7/1999 | Lynch | 712/216 |
| 5,964,866 | A | * | 10/1999 | Durham et al. | 712/200 |

* cited by examiner

*Primary Examiner*—Zarni Maung
*Assistant Examiner*—Nabil El-Hady
(74) *Attorney, Agent, or Firm*—James J. Murphy, Esq.; Winstead, Sechrest & Minick

(57) ABSTRACT

A method of dynamically adjusting a multiple stage pipeline to execute one of a set of instructions, wherein each stage has a latency and performs a selected data operation. An instruction to be executed is received and a number of stages of the pipeline is selected to execute the instruction as needed to perform a corresponding data operation. Unnecessary stages are bypassed to a reduced latency and the instruction is executed with the selected stages.

13 Claims, 4 Drawing Sheets

DYNAMIC PIPELINES WITH REUSABLE LOGIC ELEMENTS CONTROLLED BY A SET OF MULTIPLEXERS FOR PIPELINE STAGE SELECTION

CROSS REFERENCE TO RELATED APPLICATIONS

This application is a continuation of U.S. Ser. No. 08/854,654 U.S. Pat. No. 5,778,250, entitled "Method and Apparatus for Dynamically Adjusting the Number of Stages of a Multiple Stage Pipeline", filed May 12, 1997, which is a continuation of U.S. Ser. No. 08/247,657, filed May 23, 1994 (abandoned).

FIELD OF THE INVENTION

The present invention relates to processor design, and more particularly to a dynamic pipeline for executing instructions where the number of stages of the pipeline is dynamically modified depending upon the instruction or operation being executed.

DESCRIPTION OF THE RELATED ART

Pipelining is used in microprocessors to improve performance, by overlapping multiple instructions in a pipeline structure to decrease overall execution time. Each instruction is broken down into one or more common elemental operations that are performed sequentially to complete that instruction. The pipeline structure is formed of a plurality of pipe segments or stages, where each stage performs one of the elemental operations. Thus the pipeline is similar to an assembly line where each of the elemental operations is performed in a corresponding stage of the pipeline. The instruction begins at one end of the pipeline and is completed at the other end. Each stage of the pipeline is separated by registers or latches, and thus a new instruction enters the first stage of the pipeline while one or more previous instructions are being executed within subsequent stages of the pipeline. In this manner, although the time required to execute each instruction is not changed substantially, the overall execution time for a plurality of instructions is decreased.

Previously, the design of pipelines generally conformed to a few simple rules. First, the number of stages in a pipeline was determined by the most complex instruction to be performed by the processor, i.e., the number of stages was fixed to that number of stages needed to perform the most complex instruction of the processor. Thus, each instruction propagated through a fixed number of stages of the pipeline, regardless of how simple or complex that instruction was. Also, each stage was executed in a single clock cycle, and thus the speed of the clock was based on the slowest stage of the pipeline. With each edge of the clock signal, the data associated with an instruction was advanced to the next stage to perform the next elemental operation.

Pipelining has been a useful technique for improving the performance of processors for many applications. A processor using RISC (reduced instruction-set computer) principles is a prime candidate for a pipelined architecture. In a RISC processor, the instruction set is generally limited to a small number of simple functions, and thus the pipeline can be optimized to execute each of the simple instructions very quickly. Pipelining is also advantageous for use in graphics processors for the same reason. A graphics processor uses a relatively small instruction set to perform a variety of graphic data transfer operations and to execute a plurality of graphics equations. Although the present invention is not limited to any particular processor application, the preferred embodiment described below is incorporated into a graphics processor, and thus background on graphics processors is deemed appropriate.

The advent of substantial hardware improvements combined with standardized graphics languages has allowed the use of complex graphics functions in even the most common applications. For example, word processors, spreadsheets, and desktop publishing packages are now beginning to take full advantage of the improvements in graphics capabilities to improve the user interface. Although sophisticated graphics packages have been available for computer aided drafting, design and simulation for years, three dimensional graphic displays are now common in games, animation and multimedia communication designed for personal computers.

The architecture of the personal computer system has advanced to handle the sophisticated graphic capabilities required by modern software applications. In the simplest of designs, a single CPU handled all data functions, including graphics functions. In more complicated architectures, a separate graphics processor is provided to perform all graphic functions in order to relieve the primary CPU of this duty and to free up the CPU to perform other operations. Generally, the graphics processor is connected between a computer system bus and the video or frame buffer. The frame buffer is the memory which stores the video data that is actually displayed on the video screen. A video controller is connected to the frame buffer to convert the digital rasterized data from the frame buffer to the analog signals needed by the display device. In other more sophisticated architectures, the frame buffer is directly connected to the system bus, either separately or as part of the main memory, and thus the main CPU as well as the graphics processor can access the frame buffer memory across the system bus.

A graphics processor generally performs data transfer operations and functions for drawing points, lines, polylines, text, string text, triangles, and polygons to the frame buffer. Furthermore, the graphics processor performs many graphics functions on the data within the frame buffer, such as patterning, depth cueing, color compare, alpha blending, accumulation, texture assist, anti-aliasing, supersampling, color masking, stenciling, panning and zooming, error correction, as well as depth and color interpolation, among other functions.

It is evident that the demand for greater graphic capabilities have increased dramatically, and that computer architectures have been improved to partially meet these demands. Also, graphics processors must be capable of performing more sophisticated functions in less amount of time in order to process the increasingly greater amounts of graphical data required by modern software applications. Although graphics processors typically use a pipelined architecture to improve speed and performance, the ever increasing demand for more sophisticated operations has required a greater amount of time for a given stage to execute, thereby reducing performance. As processing demands increase, there is a greater need for a processor with the capability to perform more sophisticated functions in a shorter amount of time. Therefore, there is a need for improved pipelining architectures to increase processor performance, both for graphics processors and for general purpose microprocessors.

SUMMARY OF THE INVENTION

In a processor incorporating a dynamic pipeline according to the present invention, the number of stages of the pipeline is varied depending upon the complexity of the instruction being performed. The dynamic pipeline includes a set of latches to separate the stages of the pipeline. The dynamic pipeline also includes a plurality of multiplexers which dynamically alter the data path to bypass corresponding latches based on the instruction. In this manner, the number of stages is reduced for simpler instructions, i.e., the pipeline is collapsed to perform the simpler instructions in less clock cycles. Therefore, collapsing the number of stages of the pipeline to perform the simpler instructions with less stages results in increased speed and performance of the processor. The maximum number of stages is used for more complex operations, such as alpha-blending in a graphics application processor, while less stages are used for simpler operations.

In the preferred embodiment, a circuit provides data to a first latch, which provides the latched data to a first operation element. The first operation element is preferably a multiplier for alpha blending. A data selector, which is preferably a multiplexer (mux), selects between the data from the circuit or the output of the first operation element and provides an output to a second latch. The second latch provides data to a second operation element. Control logic receives the instruction currently being executed and controls the data selector based on the instruction. In this manner, depending on the instruction currently being executed, the data selector can collapse the pipeline by bypassing the first latch and the multiplier.

The first and second latches are preferably formed of two aligned latches. Thus, the second latch may include a first latch which receives data from the data selector, and a second latch which receives data from a register or other data providing means. The second operation element, which is preferably an adder, either adds or subtracts the data output from the two aligned latches.

Another data selector, also preferably a multiplexer, is optionally included to simulate the addition of another stage by selecting between the register and the second operation element. The multiplexer selects only the register if an additional stage is not needed. However, if another stage is needed, the control logic controls the second data selector to alternately select between the register and the second operation element on consecutive clock cycles. Furthermore, the control logic controls the second operation element to select the desired operation to be performed by the adder on consecutive clock cycles. The last stage may alternatively be added by including separate latches and another operation element rather than switching the data selector.

In the preferred embodiment, a first circuit includes a first set of muxes which are used to determine the source of the incoming data as well as the logic operation to be performed by an arithmetic logic unit (ALU). A color source mux determines whether the incoming data is provided from an internal polyengine color interpolator, from internal color registers, or from an external color source, such as the host CPU or a local interface. The external source is also provided to a first-in first-out (FIFO) input which is used to synchronize the incoming data for pipeline. Two input muxes select the input data provided to the ALU, which performs logic functions on the incoming data.

A second circuit preferably comprises an alpha source mux which determines the source of an alpha value for alpha blending operations. The alpha value may be supplied from an internal interpolator, from predefined alpha registers or from an external source, such as the private or frame buffer memory. The output of the alpha source mux is provided to an alpha inverter, which determines whether the source value is amplified or attenuated. The output of the ALU is provided to a first latch and to an enable mux. The output of the alpha inverter is provided to a second latch, which is aligned with the first latch. The first and second circuits effectively form a first stage of the pipeline for providing data, but is not considered part of the dynamic portion of the pipeline.

The outputs of the first and second aligned latches are provided to the respective inputs of a multiplier having its output provided to one input of a multiplier select mux. This divides the first stage from a second stage of the pipeline. The output of the ALU is also provided to the other input of the enable mux, which provides its output to a second input of the multiplier select mux. The enable and multiplier select muxes form a data selector which is used to bypass the second stage of the pipeline for those operations not requiring multiplication. Control logic receives the instruction currently being executed and controls these muxes based on the instruction.

The output of the third latch is also provided to an adder. The other input of the adder receives the output of a fourth latch aligned with the third latch. The fourth latch receives an offset scalar value from a register. The third and fourth aligned latches separate the second stage from a third stage of the pipeline and provide latched data to the adder. These latches are always used in the preferred embodiment, even when the pipeline is fully collapsed.

An offset select mux provides its output to the fourth latch which receives the output of the adder at one input and the offset scalar value from the register connected to a second input. This simulates the addition of another stage where the offset select mux is controlled by the control logic to alternately select between the register and the adder on consecutive clock cycles. The output of the adder is provided to a color and pixel mask logic, which provides its output to an output FIFO. The output FIFO provides buffered outputs to the host data bus and to the local data bus.

The number of stages of the dynamic pipeline according to the present invention is dynamically changed as follows. Each of the first through fourth latches receives a clock input and therefore latches data from its input to its output on every clock cycle. In the preferred embodiment, the dynamic pipeline has four different modes, including a fast onepipe, a fast twopipe, a read-modify-write twopipe, and a threepipe mode. The fast onepipe mode is used for simple operations. To implement a fast onepipe, the enable mux selects the output of the ALU and the multiplier select mux selects the output of the enable mux to bypass the first and second latches and the multiplier. The offset select mux selects the offset register so that the adder adds the output of the ALU to the offset value on each clock cycle.

To implement a fast twopipe, the multiplier select mux selects the multiplier output, while the offset select mux remains selected to the offset value. In this manner, the outputs of the ALU and the alpha inverter are latched on each clock cycle by the first and second latches, respectively, the latched result is multiplied together by the multiplier, and this multiplied result is added to or subtracted from an offset scalar value after the third and fourth latches are clocked. For a twopipe including read-modify-write capability, pixel values are read from an external source and placed into an input FIFO, where the external pixel values are combined with internal pixel values in the ALU. Otherwise, the pipeline operates similarly to the fast twopipe.

Finally, to implement a threepipe pipeline, the offset select mux is chosen to alternate between the output of the adder and the offset register. Thus, the outputs of the ALU and alpha subtractor are latched and multiplied in a second stage, the offset value is latched through the fourth latch and subtracted from the multiplied value in a third stage, and the result is fed back to the fourth latch and added to a new multiplied value from the third latch in a fourth and final stage of the pipeline.

It is appreciated that since the number of stages of the dynamic pipeline can be varied on demand, simpler instructions can be executed much faster to improve the overall speed and performance of the processor. This is particularly advantageous in graphic processor design, so that graphic operations can be performed at a higher rate.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
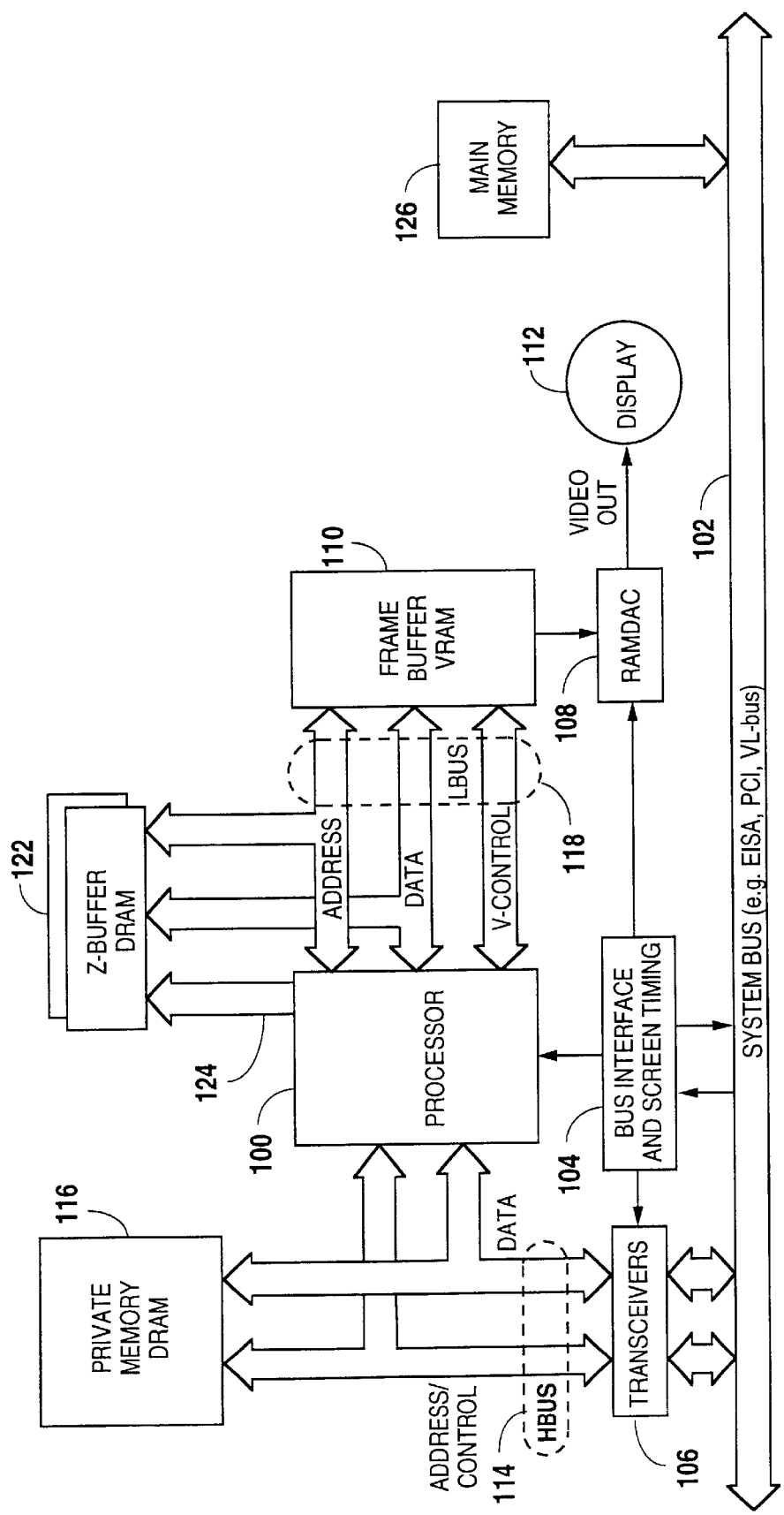
FIG. 1 is a simplified block diagram of a graphics system interfaced to a system bus of a computer system, where the graphics system includes a processor which utilizes pipelining techniques according to the present invention.

Referring now to FIG. 1, a simplified block diagram is shown of a graphics system coupled to a system bus 102 of a host computer system, where the graphics system includes a processor 100 implemented according to the present invention. Although the preferred embodiment of the present invention is implemented within the processor 100 to improve graphics performance, it is understood that a dynamic pipeline according to the present invention could be implemented in any type of processor using a pipelined architecture. The system bus 102 is any one of a plurality of different types of host or input/output (I/O) buses, including the Industry Standard Architecture (ISA), the Extended ISA (EISA), the Peripheral Component Interconnect (PCI), the Video Electronics Standards Association (VESA) Local Bus or VL-bus, or any other standardized system bus of a computer system. The processor 100 is preferably a 32-bit graphics processor operating at 33 Megahertz (MHz). The processor 100 is coupled to the system bus 102 through bus interface and screen timing logic 104, which is used to control a set of transceivers 106 and a random-access-memory digital-to-analog converter (RAMDAC) 108. The bus interface and screen timing logic 104 interfaces to the system bus 102 though transceivers 106 and controls the decoding of cycles to the RAMDAC 108 and determines video timing.

The RAMDAC 108 receives digital data stored in a frame buffer 110 and converts the digital data to the appropriate analog outputs required by a display unit 112. In the preferred embodiment, the frame buffer 110 is part of a raster display implemented in a Video RAM (VRAM) organization by Texas Instruments, where the digital data comprises a bitmap representing a rectangular array of picture elements referred to as pixels or pixel values. Each pixel value defines the color of the corresponding pixel on a screen of the display unit 112, and each pixel value is preferably 24 bits for a full color display. The display unit 112 may be any type, such as a cathode ray tube (CRT) or a liquid crystal display (LCD) commonly used for portable computers. The transceivers 106 are used to interface the processor 100 with the system bus 102 through address and data signals, collectively referred to as the HBUS 114, which is further connected to an optional private memory 116. In the preferred embodiment, the private memory 116 acts as a virtual frame buffer, display list storage, texture map, and bit-mapped font storage memory to improve performance and functionality of the graphics system. The private memory 116 is preferably added as a separate bank of external dynamic RAMs (DRAMs) for providing a performance improvement by permitting faster access to display list instructions and pixel data compared to data stored in main memory 126 of the host computer system. The graphics processor 100 communicates to the frame buffer 110 through address, data, and control lines, collectively referred to as the LBUS 118, which is further connected to a Z buffer 122, also preferably implemented using DRAMs. The Z buffer 122 is optional in a graphics system, and is preferably used to implement a depth buffer for three-dimensional (3D) graphic displays. Separate control signals 124 are also connected between the processor 100 and the Z buffer 122.

It is understood that the particular embodiment shown in FIG. 1 is only one of many possible implementations of a graphics system for use in a personal computer system. FIG. 1 is simplified for purposes of clarity, and many control signals are not shown. In the preferred embodiment, the processor 100 provides hardware support for 2D and 3D graphics, text and windowing operations of a computer system. The processor 100 transfers digital data between the main memory 126, the private memory 116, the frame buffer 110 and the Z buffer 122, and processes the data for storage in the frame buffer 110 for ultimate display on the display device 112.

Figure 2:
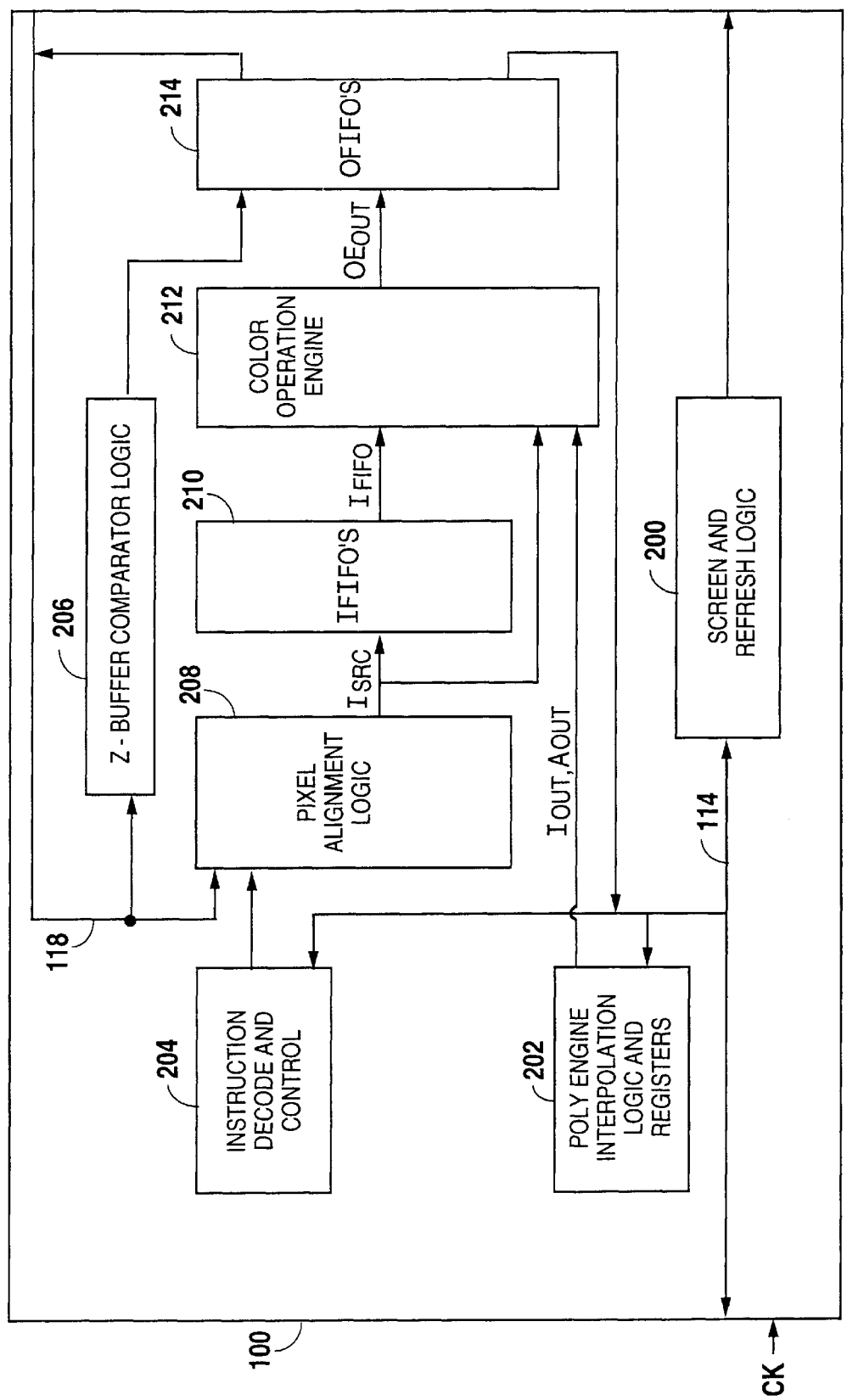
FIG. 2 is a simplified block diagram of the graphics processor of FIG. 1.

Referring now to FIG. 2, a simplified block diagram of the processor 100 is shown. The HBUS 114 is connected to screen and refresh logic 200, an interpolation logic block (polyengine) 202, instruction decode and control logic 204, output first-in, first-out latches (OFIFOs) 214 and to pixel alignment logic 208. The HBUS 114 also preferably provides a 33 MHz clock signal CK to the processor 100, which synchronizes data flow and logic within the processor 100. The screen and refresh logic 200 provides local row and column address signals to the frame buffer 110 and the Z buffer 122. The pixel alignment logic 208 preferably includes registers and shift logic for the alignment of source and destination pixel addresses. The polyengine 202 preferably receives vector data for points, lines, polylines, polygons, and other geometric quantities in the form of register files, and calculates pixel position, intensity or color, depth and transparency or alpha blending for the purpose of filling coplanar three or four sided randomly oriented polygon surfaces. Alpha blending involves scaling a single pixel value, or scaling two pixel values and adding the scaled values together. The polyengine 202 also determines address values for bit-block data transfer operations.

The polyengine 202 outputs pixel values $I_{OUT}$ and alpha values $A_{OUT}$ for alpha blending purposes to an operation engine 212. The $I_{OUT}$ and $A_{OUT}$ values are preferably 32 bits each. The processor 100 fetches instructions from main memory 126 of the host computer through the system bus 102 and the HBUS 114 and loads each instruction in an internal instruction queue memory, or directly into an instruction register (not shown), for decoding by instruction decode and control logic 204. The instruction decode and control logic 204 then executes each instruction loaded into the instruction register.

The LBUS 118 is provided to Z buffer comparator logic 206 and also to the pixel alignment logic 208. The Z buffer comparator logic 206 is generally used for 3D operations for controlling the data to be displayed in overlap or transparency situations. The pixel alignment logic 208 outputs pixel values $I_{SRC}$ to a set of input FIFOs (IFIFOs) 210 and also directly to the operation engine 212. The $I_{SRC}$ values are clocked through the IFIFOs 210 and, output as pixel values $I_{FIFO}$, which are provided to the operation engine 212. The IFIFOs 210 and the OFIFOs 214 are used to decouple the dynamic interface of the memories 110, 116 and 122. The IFIFOs 210 also synchronize source data for a pipeline 304 (FIG. 3) for read-modify-write (RMW) operations, further described below. The operation engine 212 provides output pixel values $OE_{OUT}$ to the OFIFOs 214, which also provide pixel values from the Z buffer comparator logic 206. The OFIFOs 214 provide pixel values from either the Z buffer comparator logic 206 or from the operation engine 212, and provide these values to the LBUS 118 or to the HBUS 114.

Figure 3:
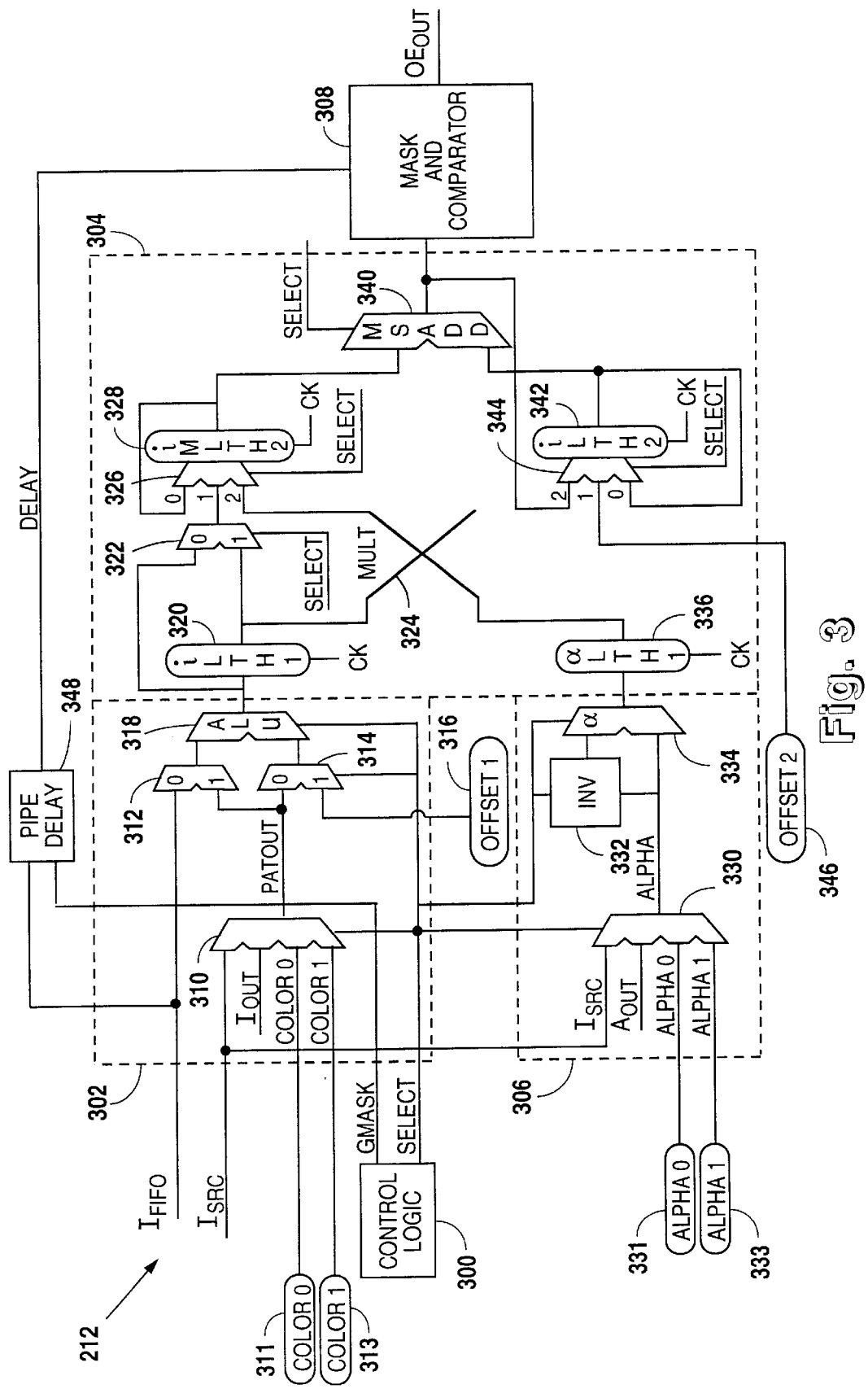
FIG. 3 is a schematic and block diagram of the operation engine of FIG. 2 including a dynamic pipeline implemented according to the present invention.

Referring now to FIG. 3, a schematic and block diagram is shown of one 8-bit slice of the operation engine 212 including the pipeline 304 implemented according to the present invention. Preferably, each slice of the operation engine 212 operates on 8-bit pixel slices, and the operation engine 212 is comprised of four similar slices for a total of 32 bits. Thus, the operation engine 212 processes four 8-bit pixel slices in parallel, where FIG. 3 shows only one of these slices for purposes of simplicity. Although the $I_{SRC}$, $I_{OUT}$ and $A_{OUT}$ pixel values are preferably 30 bits each, these values are split four ways into 8-bit values. The operation engine 212 includes control logic 300, data source select logic 302, the pipeline 304, alpha value select logic 306 and post processing logic, including mask and comparator logic 308 and pipe delay logic 348.

The control logic 300 receives control bits from an instruction loaded into the instruction register and bits from an internal control register (not shown) and preferably includes a plurality of other registers and memory for controlling most operations of the operation engine 212. For example, the control logic 300 preferably includes a block of pattern RAM memory, a disable register and a dash register for pixel and alpha value source selection. The control logic 300 provides a plurality of control and select signals, collectively referred to as SELECT signals, to various multiplexers (muxes) and operation elements within the operation engine 212. It is understood that not all of the individual signals of the collective SELECT signals are connected to each mux or operation element, since not all of the SELECT signals are necessary. Thus, only those control or select signals necessary to control each mux or operation element are connected. Each $I_{SRC}$ pixel value is provided to a first input of a four-input color source mux 310 and also to the first input of an alpha source mux 330. The color source mux 310 has a second input for receiving $I_{OUT}$ pixel values from the polyengine 202, and has two other inputs for receiving a COLOR0 pixel value from a register 311 and a COLOR1 pixel value from a register 313, respectively. The registers 311, 313 are preferably preloaded with the COLOR0 and COLOR1 pixel values before a corresponding instruction is executed by the operation engine 212. The $I_{SRC}$ pixel values are from an external source, such as from the private memory 116 or the frame buffer 110, whereas the $I_{OUT}$, COLOR0 and COLOR1 pixel values are provided internally. The color source mux 310 and the alpha source mux 330 are connected to the SELECT signals and controlled by the control logic 300.

The $I_{FIFO}$ pixel values are provided to the first input of a two-input A input mux 312, which receives the output pixel values of the color source mux 310, collectively referred to as PATOUT, at its other input. The A input mux 312 is preferably controlled by the control logic 300 through the SELECT signals. Preferably, these control signals are provided by N-FIELD bits from the instruction. The PATOUT pixel values are provided to the first input of a two-input B input mux 314, which receives an OFFSET1 scalar value from a register 316 at its other input. The OFFSET1 scalar value is preferably a constant 8-bit scalar value which is preloaded into the register 316 before the instruction is executed. The B input mux 314 is also controlled by the SELECT signals of the control logic 300, preferably through the N-FIELD bits. The outputs of the A and B input muxes 312, 314 are provided to the respective inputs of an Arithmetic and Logic Unit (ALU) 318 of the pipeline 304, where the ALU 318 performs a variety of Boolean arithmetic and logic operations as known by those skilled in the art. The operation performed by the ALU 318 is preferably determined by M-FIELD bits from the instructions register, provided through the SELECT signals.

In the preferred embodiment, there are six M-FIELD bits to select one of thirty ALU functions according to the following table 1:

TABLE 1

FUNCTIONS PERFORMED BY THE ALU 318

| M-Field [5] | [4] | [3] | [2] | [1] | [0] | |
|---|---|---|---|---|---|---|
| 0 | 0 | 0 | 0 | 0 | CIN | A plus B plus CIN |
| 1 | 0 | 0 | 0 | 0 | CIN | B plus (A not) plus CIN (B minus A) |
| 0 | 1 | 0 | 0 | 0 | CIN | A plus (B not) plus CIN (A minus B) |
| 1 | 1 | 0 | 0 | 0 | CIN | (A not) plus (B not) plus CIN |
| 0 | 0 | 0 | 1 | 0 | CIN | A EX-OR B |
| 1 | 0 | 0 | 1 | 0 | CIN | A EX-NOR B |
| 0 | 1 | 0 | 1 | 0 | CIN | A EX-NOR B |
| 1 | 1 | 0 | 1 | 0 | CIN | A EX-OR B |
| 0 | 0 | 0 | 0 | 1 | CIN | A EX-NOR B |
| 1 | 0 | 0 | 0 | 1 | CIN | A EX-OR B |
| 0 | 1 | 0 | 0 | 1 | CIN | A EX-OR B |
| 1 | 1 | 0 | 0 | 1 | CIN | A EX-NOR B |
| 0 | 0 | 1 | 0 | 0 | CIN | (A NAND B) EX-OR CIN |
| 1 | 0 | 1 | 0 | 0 | CIN | [A OR (B not)] EX-OR CIN |
| 0 | 1 | 1 | 0 | 0 | CIN | [(A not) OR B] EX-OR CIN |
| 1 | 1 | 1 | 0 | 0 | CIN | (A OR B) EX-OR CIN |
| 0 | 0 | 1 | 1 | 0 | CIN | A NAND B |
| 1 | 0 | 1 | 1 | 0 | CIN | A OR (B not) |
| 0 | 1 | 1 | 1 | 0 | CIN | (A not) OR B |
| 1 | 1 | 1 | 1 | 0 | CIN | A OR B |
| 0 | 0 | 1 | 0 | 1 | CIN | A AND B |
| 1 | 0 | 1 | 0 | 1 | CIN | (A not) AND B |
| 0 | 1 | 1 | 0 | 1 | CIN | A AND (B not) |
| 1 | 1 | 1 | 0 | 1 | CIN | A NOR B |
| 1 | 1 | 0 | 1 | 1 | CIN | B only |
| 1 | 0 | 0 | 1 | 1 | CIN | B only |
| 0 | 0 | 0 | 1 | 1 | CIN | All 1's |
| 1 | 1 | 1 | 1 | 1 | CIN | A only |
| 0 | 1 | 1 | 1 | 1 | CIN | A only |
| 0 | 0 | 1 | 1 | 1 | CIN | All 0's | where A represents the output pixel value from the A input mux 312, B represents the output pixel value from the B input mux 314, and CIN stands for "carry in" from a prior logic operation. The M-FIELD bits for selecting the function of the ALU 318 illustrate how the instruction controls the operation performed by the ALU 318. Other operation elements, such as arithmetic adder elements 340, 404 (FIG. 4) and 410 are controlled in a similar manner. Furthermore, select muxes, such as the color source mux 310, the alpha source mux 330, the A and B input muxes 312, 314, as well as other muxes 322, 326, 344 and 412, further defined below are controlled in a similar manner, except that other decode logic would be included within the control logic 300 to decode the bits of the instruction and bits from other registers, including a control register. The details of the control logic 300 are not provided since it could be implemented in many ways known to those skilled in the art of processor design.

The pixel values from the ALU 318 are provided to the input of a first latch 320 and to the fist input of a bypass mux 322. The output of the latch 320 is provided to the second input of the bypass mux 322 and also to one input of a multiplier 324. The latch 320 is preferably clocked by the rising edge of the CK clock signal, so that its input is latched to its output after every rising edge of the CK signal. The other input of the multiplier 324 is connected to the output of a second latch 336, which is preferably aligned with the first latch 320. The latch 336 operates and is clocked by the CK clock signal in a similar manner as described for the latch 320. The first and second latches 320, 336 could alternatively be implemented as one larger latch having two subfields, as is common in pipelines as known to those skilled in the art of processor design. The output of the multiplier 324 is provided to one input of a three-input multiplier select mux 326, which provides its output to a third latch 328. The output of the latch 328 is fed back to a second input of the select mux 326, which has a third input receiving the output of the bypass mux 322. Again, the latch 328 operates and is clocked by the CK clock signal in a similar manner as described for the latches 320 and 336. The feedback path of the output of the latch 328 to the second input of the select mux 326 allows the data to remain unchanged during successive CK cycles.

The bypass mux 322 and the select mux 326 are connected to the SELECT signals and controlled by control logic 300. In this manner, the bypass mux 322 is used to bypass the latch 320 and the select mux 326 is used to bypass the multiplier 324 depending upon the instruction being performed. The latches 320 and 336 serve to provide data operands to the multiplier 324. This effectively operates as the first stage of the pipeline 304. However, for purposes of explanation and convention, latches are used to separate stages so that the data providing circuitry up to the ALU 318 and the alpha subtractor mux 334 will be considered the first stage. Thus, the latches 320 and 336 and the multiplier 324 form a second stage, and the bypass mux 322 and the select mux 326 operate as a data selector to bypass the second stage of the pipeline 304. This occurs if the instruction does not require multiplication. It is also noted that the multiplier 324 could be any other type of operation element, such as an ALU or adder element. Thus, for purposes of the present invention, the multiplier 324 could be replaced by any function or operation unit depending on the needs of a pipeline.

The alpha source mux 330 has a second input for receiving the $A_{OUT}$ alpha values from the polyengine 202, and also has two other inputs for receiving a pixel value ALPHA0 from a first register 331 and a pixel value ALPHA1 from a second register 333, respectively. In this case, the $I_{SRC}$ value provides an external alpha value, whereas the $A_{OUT}$, ALPHA0 and ALPHA1 values provide internal alpha values. The output ALPHA value from the alpha source mux 330 is provided to one input of an alpha subtractor mux 334, and to the input of an alpha inverter 332. The output of the alpha inverter 332 is provided to the other input of the alpha subtractor 334. The alpha inverter 332 and the alpha subtractor 334 are preferably controlled by two of the SELECT signals from the control logic 300, which determine the alpha value to be provided to the multiplier 324 during each CK cycle. Preferably, the alpha inverter 332 inverts the bits of the ALPHA value and provides the result to the alpha subtractor mux 334. The alpha subtractor mux 334 selects either the ALPHA value from the alpha source mux 330, or selects the inverted ALPHA value from the alpha inverter 332. Thus, the alpha inverter 332 and the alpha subtractor mux 334 together form an alpha inversion function, to either pass the ALPHA value or its inverted value based on the instruction as interpreted by the control logic 300.

The ALPHA value is preferably an 8-bit number between 00h and FFh (0 and 255 decimal) used for alpha blending purposes, where the 8-bit number represents a fractional number between 0 and 1, referred to as $\alpha$. A small 'h' following a number denotes hexadecimal notation. The alpha inverter 332 inverts the ALPHA value to achieve another 8-bit fractional number equivalent to 1–$\alpha$. It is known that the inverted value of a hexadecimal number representing a fraction is equivalent to subtracting that fraction from one (FFh). Thus, either the value a or the value 1–$\alpha$ is provided by the alpha subtractor mux 334 to determine the appropriate amount of blending. For example, if the ALPHA value is BFh (191 decimal) then it represents an a value of about 0.75 or 75%. 1–$\alpha$ is FF–BF=40h (64 decimal) representing a fraction of 0.25 or 25%. As will be described more fully below, for two number blending, one number is multiplied by a and another number is multiplied by 1–$\alpha$, and the resulting values are added together. The output of the alpha subtractor mux 334 is provided to the input of the third latch 336.

The multiplier 324 multiplies the 8-bit numbers from each of the latches 320 and 336 to form an internal 16-bit number, then truncates the least significant 8 bits and provides the most significant 8 bits at its output. In this manner, the multiplier 324 effectively multiplies the pixel value from the latch 320 by $\alpha$ or 1–$\alpha$ from the latch 336, and provides the result to the select mux 326. For example, if a pixel value of FFh is multiplied by an alpha value of BFh (191 decimal, representing 75%), an internal 16-bit value of BE41 results, so that the multiplier 324 provides a number BEh (190 decimal) at its output. Note that 75% of 255 is 191.25, so the result is very close to the actual value. As another example, if the pixel value is 99h (153 decimal), and the alpha value is 40h (decimal 64, or 25%), then the internal result is 2640h, which is truncated to 26h (decimal 38) at the output, which is close to the actual result of 38.25. It is understood that the numerical computations illustrated in the preceding paragraphs are provided only as examples, and that the digital numbers could be expressed in other forms, such as 1's compliment or 2's compliment. In fact, all numbers in the pipeline 304 are preferably expressed in 2's compliment form to simplify calculations and logic. Nonetheless, the principles are similar.

The output of the latch 328 is provided to one input of an adder 340, which receives the output from a fourth latch 342 at its other input. The adder 340 either adds its inputs together, or subtracts the data from the latch 342 from the data of the latch 328, depending upon the SELECT signals from the control logic 300. Although the adder 340 is an arithmetic element for performing addition and subtraction in the preferred embodiment, it is understood that the adder 340 could be any type of operation element as known to those skilled in the art. For example, the adder 340 could be replaced by an ALU or multiplier, depending upon the type of pipeline implemented. The latches 328 and 342 and the adder 340 form a division between the second and third stages of the pipeline 304. However, the latches 328 and 342 also separate the first stage from the second stage if the bypass and select muxes 322, 326 bypass the multiplier 324. Thus, the latches 328 and 342 are always used in the pipeline 304 even when fully collapsed.

A three-input offset mux 344 receives the fed back output of the latch 342 at one input, an OFFSET2 scalar value from an offset register 346 at its second input and the fed back output of the adder 340 at its third input. The OFFSET2 scalar value is similar to the OFFSET1 scalar value, and is also preloaded into the register 346 before the instruction is performed. The output of the offset mux 344 is provided to the latch 342, and is also controlled by the control logic 300 through the SELECT signals. Again, the output of the latch 342 is fed back to one input of the offset mux 344 to maintain stable data during successive cycles of the CK signal, if desired. As will be described more fully below, the offset mux 344 effectively adds another stage to the pipeline 304, but uses the latches 328 and 342 and the adder 340 to do so. These elements are used again to save logic.

The output of the adder 340 is provided to the mask and comparator logic 308, which performs color masking to bounds, color clamping to bounds, color masking to source values and various other pixel comparing and masking functions. The pipe delay unit 348 receives the $I_{FIFO}$ pixel values from the IFIFO 210 and a signal GMASK from the control logic 300, and provides delay signals, collectively referred to as DELAY, to control the mask and comparator logic 308. The details of the mask and comparator logic 308 are not necessary for full disclosure of the present invention. The mask and comparator logic 308 provides the $OE_{OUT}$ signals of the operation engine 212.

The operation of the operation engine 212 and the pipeline 304 will now be described by illustrating the execution of several equations. It is appreciated that only a few equations will be described below for illustrating several modes of the pipeline 304, although many other different equations can be solved by the operation engine 212. The control logic 300 receives the bits of the instruction register and the control register and controls the color source mux 310, the A and B input muxes 312, 314, the Boolean function performed by the ALU 318, the bypass mux 322, the select mux 326, the alpha select mux 330, the alpha inverter 332, the alpha subtractor 334, the offset select mux 344 and the adder 340. To implement a two stage pipe, referred to as a fast onepipe mode in the preferred embodiment, only the latches 328 and 342 are used, while the alpha select mux 330, the alpha inverter 332, the alpha subtractor 334 and the multiplier 324 are bypassed. In this mode, only write only lines, polylines, and polygons are used to render flat or shaded two-dimensional objects to the frame memory 110 or to the private memory 116, and no alpha multiplication or intensity scaling is performed. In the fast onepipe mode, only two sub-operations are required to complete each task as clocked into the latches 328 and 342 through the adder 340. In this manner, at least two cycles of the CK clock signal are saved when loading the pipeline 304, compared to a full pipeline.

For example, suppose that it is desired to perform the following equation 1:

$$\text{Color}|_{out} = (\text{Color}|_{internal} \; OP \; \text{OFFSET1}) - \text{OFFSET2} \quad (1)$$

where $\text{Color}|_{out}$ is a pixel value to be written to some address in the frame buffer 110, $\text{Color}|_{internal}$ denotes one of the $I_{OUT}$, COLOR0 or COLOR1 pixel values, and "OP" is any one of the functions desired to be performed by the ALU 318 from those values listed in TABLE 1. The latches 328 and 342 are initially cleared to zero, and the outputs of the latches 328 and 342 are initially selected by the muxes 326 and 344, respectively, while the pipeline 304 is loaded with data. If the pixel values $I_{OUT}$ from the polyengine 202 are desired, the SELECT signals are asserted so that the color select mux 310 selects the $I_{OUT}$ pixel value, the A input mux 312 selects the PATOUT signals, and the B input mux selects the register 316 to receive the OFFSET1 scalar value. The SELECT signals are also asserted to select the appropriate function of the ALU 318. Most importantly for purposes of the present invention, the bypass mux 322 is controlled to select the output from the ALU 318 to bypass the latch 320 and the select mux 326 is controlled to select the output from the bypass mux 322 for a fast onepipe mode, so that data from the ALU 318 is provided directly to the latch 323 through the select mux 326. The offset select mux 344 selects the register 346, so that the latch 342 latches the OFFSET2 scalar value from the register 346 during every CK cycle. The SELECT signals control the adder 340 to subtract values from the latch 342 from values from the latch 328. Thus, the adder 340 subtracts the OFFSET2 scalar value from the result from the ALU 318 latched through the latch 328, and the result is provided to the mask and comparator logic 308 after every CK cycle.

It is clear that any OP function may be selected to be performed by the ALU 318. For example, if the M-FIELD (5,1) bits are 0000b (small 'b' indicating a binary number) indicating addition, then the $I_{OUT}$ pixel value is added to the OFFSET1 scalar value. Of course, if it is desired not to further adjust using the OFFSET2 scalar value, the register 346 is loaded with 00h. Also, an external pixel value could be used, where the color select mux 310 chooses the $I_{SRC}$ pixel value.

A second mode is defined to implement a three-stage, fast twopipe mode for all write only bit block transfers to the frame buffer 110, the Z buffer 122, the private memory 116 or the main memory 126. This mode is also used for string bit block simplex mode transfers and for write only render operations with alpha intensity scaling. Furthermore, the fast twopipe is used to render flat or depth cued, shaded, 2D lines, polylines, or polygons. For the fast twopipe, the select mux 326 selects the output of the multiplier 324, so that the values provided out of the latches 320 and 336 are multiplied together and latched through the latch 328 during each CK cycle. In this manner, the latches 320 and 336 add another stage to the pipeline 304 compared to the fast onepipe mode. Also, the alpha source mux 330 selects one of its inputs to provide the ALPHA signal, and the alpha subtractor 334 provides the alpha value α or 1−α to the latch 336, as controlled by the control logic 300 through the SELECT signals.

As an example, the fast twopipe is used to solve the following equation 2:

$$\text{Color}|_{out} = \beta(\text{Color}|_{source} \; OP \; \text{OFFSET1}) - \text{OFFSET2} \quad (2)$$

where β is defined as the selected alpha value, which is either α or 1−α, and $\text{Color}|_{source}$ is any external or internal pixel value selected by the color select mux 310. To initialize, appropriate COLOR0, COLOR1, ALPHA0, ALPHA1 values are loaded into the registers 311, 313, 331, 333, respectively, and scalar values are loaded into the registers 316 and 346, if desired. The latches 320, 336, 328 and 342 are initially cleared. The color select mux 310 selects the appropriate pixel value from $I_{SRC}$, $I_{OUT}$, COLOR0 or COLOR1, and the alpha select mux 330 selects the appropriate ALPHA value from $I_{SRC}$, $A_{OUT}$, or the ALPHA0 or ALPHA1 values from the registers 331, 333. The alpha inverter 332 and subtractor 334 are controlled to select either $\alpha$ or $1-\alpha$ as described previously. During the first CK cycle, the alpha value is latched through the latch 336 and is multiplied by the multiplier 324 with the input source data from the ALU 318 latched through the latched 320, and the result provided to the input of the latch 328. During the second CK cycle, the latch 328 latches the multiplied value from the multiplier 324, and the latch 342 latches the OFFSET2 scalar value. The OFFSET2 scalar value is immediately subtracted from the output of the latch 328 by the adder 340, and the result is provided to the mask and comparator logic 308. Meanwhile, the latches 320 and 336 latch a new pixel and alpha value to be multiplied during the second CK cycle. In this manner, the fast twopipe includes three stages, where a separation between the first and second stages is implemented by the latches 320 and 336, and the separation between the second and third stages is implemented by the latches 328 and 342.

The third mode is a read-modify-write (RMW) twopipe pipeline mode, which is used for any two operand render operations where the pixel value is provided from an external buffer and is operated on by an internal or fixed pixel value. This RMW twopipe mode is used for all simplex source destination bit block transfers and for all RMW 3D render operations in the preferred embodiment. Although the Z buffer comparator logic 206 is typically included in this mode, its function will not be described for purposes of clarity of the present invention. Operation is similar to that described above for the fast twopipe mode, except that data pixel values from the external source, such as the frame buffer 110 or the private buffer 116, are loaded into the IFIFOs 210 to be combined with internal pixel values. For 3D render operations, the following equation 3 is performed:

$$\text{Color}|_{OUT} = \beta(\text{Color}|_{external} \text{ OP Color}|_{internal}) \quad (3)$$

where $\text{Color}|_{internal}$ is from either the internal color registers 311, 313 or the $I_{OUT}$ pixel value from the polyengine 202, $\text{Color}|_{external}$ is provided by the $I_{FIFO}$ pixel values through the IFIFOs 210 from either the frame buffer 110 or the private memory 116, and $\beta$ is $\alpha$ or $1-\alpha$.

To execute equation 3, pixel values are read from the external source and loaded into the IFIFOs 210. The color select mux 310 selects one of the internal $I_{OUT}$, COLOR0 or COLOR1 pixel values and the A input mux 312 selects the $I_{FIFO}$ pixel values. The B input mux 314 selects the PATOUT signals. The alpha select mux 330 selects the appropriate source of the ALPHA value, and the alpha inverter 332 and subtractor mux 334 perform the alpha function. The appropriate function is selected by the ALU 318. On the first CK cycle, the output from the ALU 318 is latched through the latch 320 and multiplied by the alpha value latched by the latch 336. On the second CK cycle, the output of the multiplier 324 is latched through the latch 328 and placed on the desired external bus.

Finally, a four stage, threepipe mode is used for all complex bit-block 3D and third operand operations, including bit-block 2D or 3D rectangular pattern with full alpha blending operations. The full operating equation 4 for alpha blending is defined as follows:

$$\text{Color}|_{OUT} = \alpha(\text{Color}|_{internal} + \text{OFFSET1}) + (1-\alpha)(\text{Color}|_{external} + \text{OFFSET1}) - \text{OFFSET2} \quad (4)$$

To implement the threepipe mode using four stages, operation is similar to that described above for the fast twopipe mode, except that the offset select mux 344 alternates between the output of the adder 340 and the OFFSET2 scalar value from the register 346. This effectively adds another stage to the pipeline 304. An internal pixel value is selected as described previously by the color select mux 310 and provided to the ALU 318 by the A input mux 312. The B input mux selects the register 316, and these values are added together by the ALU 318. Meanwhile, the alpha select mux 330 selects the appropriate ALPHA value, which is provided through the alpha subtractor 334. Upon the first CK cycle, the outputs of the ALU 318 and the alpha subtractor 334 are latched by latches 320, 336 and multiplied together through the multiplier 324 and provided to the input of the select mux 326. This value is $\alpha(\text{Color}|_{internal} + \text{OFFSET1})$. On the second CK cycle, the output of the multiplier 324 and the OFFSET2 scalar value from the register 342 are provided to the adder 340, where the adder 340 subtracts the OFFSET2 scalar value from the value provided by the latch 328, to achieve the result $\alpha(\text{Color}|_{internal} + \text{OFFSET1}) - \text{OFFSET2}$. The offset select mux 344 is then switched to select the output of the adder 340.

Meanwhile, an external pixel value is selected by the color select mux 310 and added to the OFFSET1 scalar value from the register 316 through the ALU 318. The same ALPHA value is provided from the alpha select mux 330, except that now the alpha inverter 332 and subtractor 334 subtract the ALPHA value from 255 to calculate $1-\alpha$, and this alpha value is provided to the latch 336. The outputs of the ALU 318 and the alpha subtractor mux 334 are multiplied together through the multiplier 324 and provided to the select mux 326 during the second CK cycle, to achieve the value $(\alpha-1)(\text{Color}|_{external} + \text{OFFSET1})$. Thus, the value $(\alpha-1)(\text{Color}|_{external} + \text{OFFSET1})$ is provided at the input of the latch 328 and the value $\alpha(\text{Color}|_{internal} + \text{OFFSET1}) - \text{OFFSET2}$ is provided to the input of the latch 342 after the second CK cycle. Upon the third CK cycle, these respective values are clocked through the latches 328 and 342, and added together by the adder 340, and provided to the mask and comparator logic 308. In the interim, new values from the ALU 318 and the alpha subtractor mux 334 are multiplied together and provided to the select mux 326, and the offset select mux 340 is switched back to receive the OFFSET2 scalar value from the register 342. Thus, upon the next CK cycle, the latches 328 and 342 are latched to subtract the OFFSET 2 scalar value from the output of the multiplier 324 provided by the latch 328. It is appreciated that once all of the stages of the pipeline 304 are full, a new value from the pipeline 304 is provided on each CK cycle, even for complicated bit block 3D and operand operations for the threepipe mode.

Figure 4:
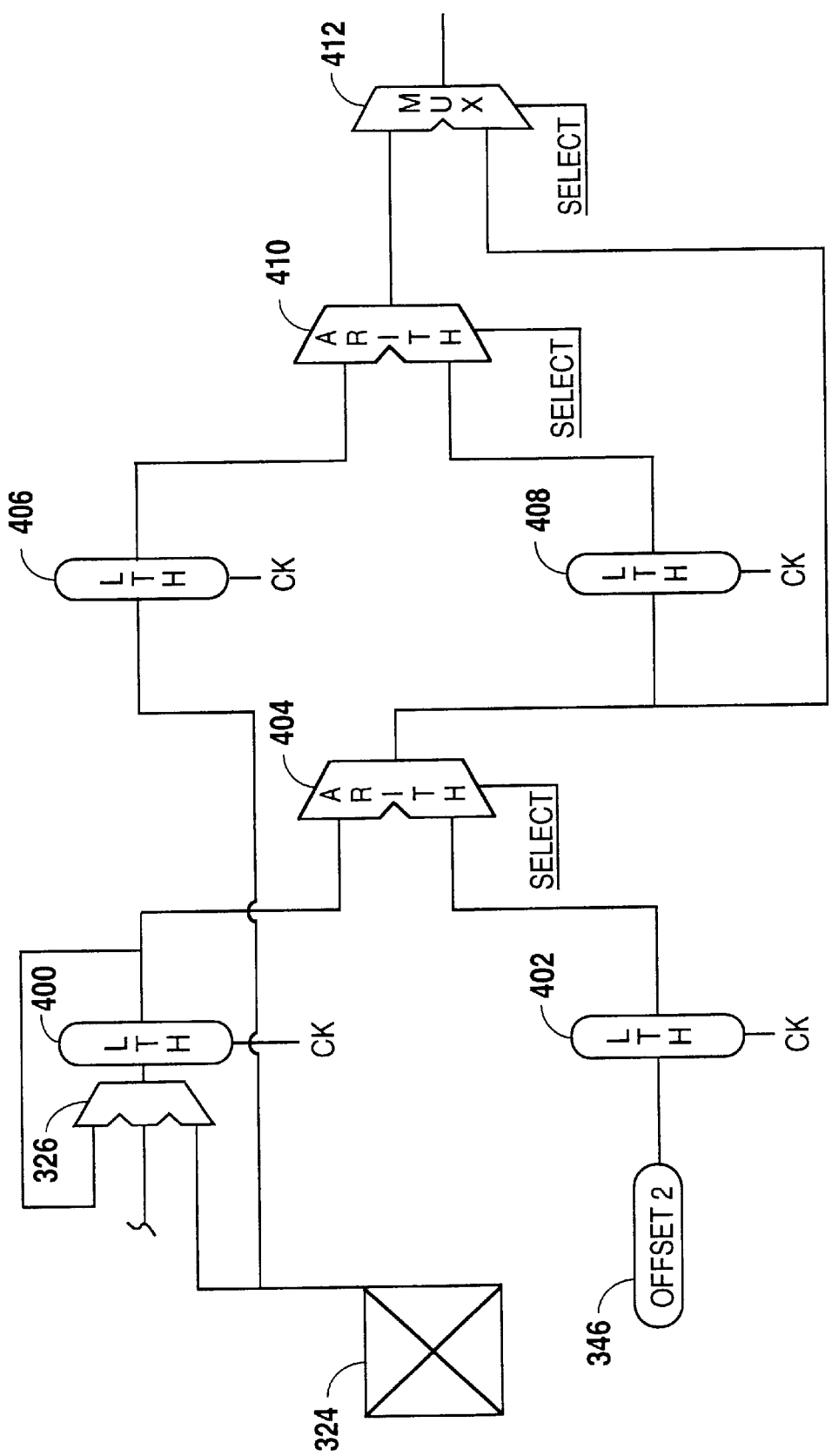
FIG. 4 is a schematic diagram illustrating an alternative embodiment of a portion of the dynamic pipeline of FIG. 3.

It is appreciated that the latches 328 and 342 and the adder 340 serve as the second and the third set of latches for the threepipe mode, where the offset mux 344 is toggled by the control logic 300 to switch between the register 346 and the output of the adder 340. Referring now to FIG. 4, an alternative embodiment is shown to replace the latches 328, 342, the adder 340 and the offset mux 344. The select mux 326 receives the output of the multiplier 324 as before, but provides its output instead to a latch 400. The output of the latch 400 is fed back to an input of the select mux 326 as before, but also provides its output to one input of a two-input arithmetic element 404. The register 346 provides its output directly to a latch 402, which provides its output to the other input of the arithmetic element 404. The output of the multiplier 324 is also provided to the input of another latch 406, and the output of the arithmetic element 404 is provided to the input of another latch 408. The outputs of the latches 406 and 408 are provided to the respective inputs of a two-input arithmetic element 410, which provides its output to one input of a two-input output mux 412. The output of the arithmetic element 404 is provided to the other input of the output mux 412. The CK signal is provided to clock the latches 400, 402, 406 and 408 in a similar manner as described previously, and the SELECT signals from the control logic 300 is provided to control the arithmetic elements 404 and 410 and the output mux 412.

The functions performed by the alternative embodiment shown in FIG. 4 is similar to corresponding elements of the pipeline 304 of FIG. 3. If the output mux 412 selects the output of the arithmetic element 410, the final stage comprising the latches 406 and 408 and the arithmetic element 410 are placed in the pipeline, which is similar to the select mux 344 alternately selecting the outputs of the adder 340 and the register 346 to add a final stage. However, if the output mux 412 selects the output of the arithmetic element 404, the pipe stage comprising the latches 406 and 408 and the arithmetic element 410 are bypassed, which is similar to the function of the select mux 344 bypassing the output of the adder 340 by selecting only the register 346, thereby bypassing the final stage of the pipeline 304. It is appreciated that the embodiment shown in FIG. 3 is preferred, since it uses less logic elements and is thus cheaper and easier to build. Nonetheless, FIG. 4 more clearly shows the two separate stages implemented by the latches 328, 342, the adder 340, the control logic 300 and the select mux 344 of FIG. 3. Although the latch 402 of FIG. 4 is extraneous since the register 346 could be provided directly to the input of the arithmetic element 404, the latch 402 would be necessary if more complicated select logic were used instead of the register 346.

It can now be appreciated that a dynamic pipeline according to the present invention is used in a processor to improve performance. All stages of the pipeline can be used to access the operation elements necessary to perform the most complex instructions. Control logic and data selectors provide a means to bypass certain stages to collapse the pipeline to execute simpler instructions. Performance is improved since it takes less clock cycles to fill the pipeline for the simpler instructions, since less stages are present. The present invention has been illustrated using a graphics processor, but it is understood that the present invention could be used to improve performance of any processor using a pipeline architecture, e.g. RISC processors.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method of dynamically adjusting a predetermined number of stages in a multiple stage pipeline of a process to execute one of a set of instructions, wherein each stage of said predetermined number of stages has latency and performs a selected data operation, the method comprising:

receiving an instruction to be executed;

selecting a number of stages of the pipeline to execute the instruction as needed to perform corresponding data operations and bypassing unnecessary stages to reduce latency, said step of selecting comprising the sub step of selectively interconnecting reusable logic elements under the control of a set of multiplexers to create a pipeline of the selected number of stages; and executing the instruction with the selected number of stages.

2. The method of claim 1, wherein said selecting comprises using the instruction to determine which stages in the pipeline are needed to execute the instruction.

3. The method of claim 2, wherein the pipeline includes a predetermined number of stages, and wherein said selecting comprises bypassing at least one stage.

4. The method of claim 2, wherein each stage is associated with an operation and wherein said selecting comprises selecting only those operations needed to execute the instruction.

5. The method of claim 1, wherein said selecting comprises bypassing all except one stage to achieve a onepipe pipeline.

6. The method of claim 1, wherein said selecting comprises bypassing all except two stages to achieve a twopipe pipeline.

7. A dynamic pipeline for a processor that executes any one of a set of instructions, comprising:

a predetermined plurality of stages, wherein each stage of said predetermined plurality of stages has a latency and performs a corresponding operation; and control and select logic coupled to said predetermined plurality of stages that receives an instruction, that selects any of said predetermined plurality of stages to perform corresponding operations needed to execute the instruction and that bypasses unnecessary stages to reduce latency, said control and select logic comprising:

a plurality of logic elements and a set of multiplexers for selectively interconnecting said predetermined plurality of stages, the logic elements selectively reused under control of said set of multiplexers to create a pipeline of a selected plurality of stages for performing said corresponding needed to execute said instruction.

8. The dynamic pipeline of claim 7, wherein said control and select logic includes:

decode logic that decodes the instruction and selects at least one of said predetermined plurality of stages; and bypass logic coupled to said decode logic and said predetermined plurality of stages that correspondingly bypasses unnecessary stages according to the decode logic.

9. The dynamic pipeline of claim 7, wherein each stage of said predetermined plurality of stages is associated with at least one clock cycle of latency.

10. The dynamic pipeline of claim 7, wherein at least one stage of said predetermined plurality of stages includes an operation element.

11. The dynamic pipeline of claim 10, wherein said operation element comprises a multiplier unit.

12. The dynamic pipeline of claim 10, wherein said operation element comprises an arithmetic unit.

13. The dynamic pipeline of claim 10, wherein said operation element comprises an arithmetic and logic unit.

* * * * *